United States Patent
Osada et al.

(10) Patent No.: US 8,313,846 B2
(45) Date of Patent: Nov. 20, 2012

(54) MAGNETIC ARTIFICIAL SUPERLATTICE AND METHOD FOR PRODUCING THE SAME

(75) Inventors: Minoru Osada, Ibaraki (JP); Takayoshi Sasaki, Ibaraki (JP)

(73) Assignee: National Institute of Materials Science, Ibaraki (JP)

( * ) Notice: Subject to any disclaimer, the term of this patent is extended or adjusted under 35 U.S.C. 154(b) by 820 days.

(21) Appl. No.: 12/086,256

(22) PCT Filed: Dec. 13, 2006

(86) PCT No.: PCT/JP2006/324830
§ 371 (c)(1),
(2), (4) Date: Apr. 22, 2009

(87) PCT Pub. No.: WO2007/069638
PCT Pub. Date: Jun. 21, 2007

(65) Prior Publication Data
US 2009/0225635 A1 Sep. 10, 2009

(30) Foreign Application Priority Data
Dec. 13, 2005 (JP) .................. 2005-358374

(51) Int. Cl.
*G11B 11/105* (2006.01)
*G11B 5/842* (2006.01)
(52) U.S. Cl. .......... 428/819.1; 428/820; 428/820.1; 428/820.4; 428/822.1; 428/693.1; 427/127
(58) Field of Classification Search ................ None
See application file for complete search history.

(56) References Cited

U.S. PATENT DOCUMENTS

| 5,783,295 A * | 7/1998 | Barnett et al. ........... 428/216 |
| 6,919,138 B2 * | 7/2005 | Koinuma et al. .......... 428/660 |
| 2001/0024718 A1 * | 9/2001 | Sasaki et al. ........... 428/325 |
| 2003/0091500 A1 | 5/2003 | Koinuma et al. |
| 2005/0233163 A1 | 10/2005 | Koinuma et al. |
| 2008/0311429 A1 * | 12/2008 | Katsuragawa et al. .... 428/820.1 |
| 2011/0183133 A1 * | 7/2011 | Osada et al. ............ 428/220 |

FOREIGN PATENT DOCUMENTS

| JP | 04-035003 | 2/1992 |
| JP | 05-259403 | 10/1993 |
| JP | 09-121065 | 5/1997 |
| JP | 2001-270022 | 10/2001 |
| JP | 2002-145622 | 5/2002 |
| JP | 2003-335522 | 11/2003 |
| JP | 3513589 | 1/2004 |
| JP | 2004-255684 | 9/2004 |
| JP | 2006-049729 | 2/2006 |
| JP | 2006-133726 | 5/2006 |
| JP | 2006-199556 | 8/2006 |

OTHER PUBLICATIONS

Machine Translation of JP 2006-199556 A (pub. 2006).*
International Search Report mailed Feb. 13, 2007 for International Application No. PCT/JP2006/324830.

* cited by examiner

*Primary Examiner* — Kevin Bernatz
(74) *Attorney, Agent, or Firm* — Wenderoth, Lind & Ponack, L.L.P.

(57) ABSTRACT

A magnetic artificial superlattice is composed of laminated thin films including two or more kinds of magnetic flaky particles (magnetic titania nanosheets) obtained by exfoliation of a layer titanium oxide in which Ti atoms in the lattice have been substituted with magnetic elements.

14 Claims, 14 Drawing Sheets $Ti_{0.91}O_2$ $Ti_{0.6}Fe_{0.4}O_2$ $Ti_{0.8}Co_{0.2}O_2$

MAGNETIC ARTIFICIAL SUPERLATTICE AND METHOD FOR PRODUCING THE SAME

TECHNICAL FIELD

The present invention relates to a magnetic artificial superlattice and a method for making the same, wherein the magnetic artificial superlattice transmits visible light, exhibits high magneto-optical properties in ultraviolet to visible region, and thus is suitable for the use in IT fields such as an optical isolator or high density magnetic recording.

BACKGROUND ART

A magnetic substance material which exhibits high magneto-optical properties while transmitting light will actualize optical isolators utilizing magneto-optical effect and high density magnetic recording, which are required for transfer of large amounts of information. This allows the production of electromagnetic materials necessary for transfer of large amounts of information. Therefore, development of materials having high magneto-optical properties has been desired.

Examples of known materials having high magneto-optical properties include magnetic garnet materials (for example, YIG and GdBiG) for long wavelengths (from 1.3 to 1.5 μm), and dilute magnetic semiconductor materials (for example, HgCdMnTe and CdMnTe) for short wavelengths (from 0.6 to 1 μm) (Non-patent Document 1). The magnetic garnet materials are practically used as optical isolators for optical information communication.

Non-patent Document 1: Katsuaki Sato, "Hikari to Jiki Kaiteiban" (Asakura Publishing Co., Ltd., 2001), Chapter 7, p. 177-191.

SUMMARY OF INVENTION

Problems to be Solved by Invention

The above-described material is suitable for, for example, current optical information communication at a 1.55 μm band. High speed communication and high density magnetic recording for the future will require the improvement of magneto-optical properties over a wide range from the ultraviolet region with short wavelengths to the visible region, and shortening of the magneto-optical response wavelength. In order to improve the magneto-optical performance, which is the principle of operation of magneto-optical recording, it is important to precisely control the composition and architecture of films at the level of atoms and molecule layers, as exemplified by metal artificial lattice materials.

From such background, it has been desired to develop a magnetic nanomaterial which exhibits high magneto-optical properties over a range from the ultraviolet region with short wavelengths to the visible region, and allows control of properties such as magneto-optical response wavelength and intensity through engineering film architecture.

The present invention is intended to provide a magnetic artificial superlattice and method for making the same, wherein the magnetic artificial superlattice exhibits high magneto-optical properties over a range from the ultraviolet region to the visible region, and allows control of the properties.

Means for Solving the Problem

The present inventors eagerly keenly studied to solve the above problems. As a result of this, the inventors have found that a magnetic artificial superlattice composed of different number and kind of layers including two or more kinds of magnetic substance flaky particles (hereinafter referred to as magnetic titania nanosheet) obtained by exfoliation of a layer titanium oxide, in which Ti atoms in the lattice have been substituted with magnetic elements, allows control of optical transition between different magnetic metals via interlayer interaction, and that the utilization of the optical transition provides controllable high magneto-optical properties over a range from the ultraviolet region to the visible region. Accordingly, they have completed the present invention on the basis of these technical findings.

A first aspect of the present invention is a magnetic artificial superlattice composed of laminated thin films of two or more kinds of magnetic flaky particles (hereinafter referred to as magnetic titania nanosheets) obtained by exfoliation of a layer titanium oxide in which Ti atoms in the lattice have been substituted with magnetic elements.

A second aspect of the present invention is the magnetic artificial superlattice according to the first aspect, which is composed of laminated thin films including the magnetic titania nanosheets and another flaky particles obtained by exfoliation of a layer titanium oxide (hereinafter referred to as non-magnetic titania nanosheets).

A third aspect of the present invention is the magnetic artificial superlattice according to the first or second aspect, wherein the magnetic titania nanosheets are composed mainly of titania expressed by a composition formula $Ti_{1-x}M_xO_2$ (wherein M is at least one selected from V, Cr, Mn, Fe, Co, Ni, and Cu, and $0<x<1$, or M is at least two or more metals comprising one selected from V, Cr, Mn, Fe, Co, Ni, and Cu, and at least one selected from Li, Mg, and Al, and $0<x<1$).

A fourth aspect of the present invention is the magnetic artificial superlattice according to second aspect, wherein the non-magnetic titania nanosheets are composed mainly of titania expressed by a composition formula $Ti_{1-\delta}O_2$ ($0<\delta<0.5$) or $Ti_{1-x}M_xO_2$ (wherein M is one or more metals selected from Li, Mg, Al, V, Cr, Mn, Fe, Co, Ni, Cu, and Zn, $0\leq x<1$).

A fifth aspect of the present invention is a magnetic artificial superlattice composed of thin films of the magnetic artificial superlattice according to any one of the first to fourth aspects, and at least one selected from an organic polymer, an inorganic polymer, and an inorganic compound containing a metal complex or a polynuclear hydrate ion.

A sixth aspect of the present invention is a method for making a magnetic artificial superlattice, including laminating magnetic titania nanosheets, or magnetic titania nanosheets and non-magnetic titania nanosheets on a substrate with an organic polycation sandwiched therebetween.

A seventh aspect of the present invention is the method for making a magnetic artificial superlattice according to the sixth aspect, wherein the nanosheets are laminated by adsorption and accumulation on the substrate.

An eighth aspect of the present invention is the method for making a magnetic artificial superlattice according to the sixth aspect, wherein the titania nanosheets are laminated by spin coating or dip coating.

A ninth aspect of the present invention is a magneto-optical device including the magnetic artificial superlattice according to any one of the first to fifth aspects, the magneto-optical device responding to short-wavelength visible light and ultraviolet light.

A tenth aspect of the present invention is a magnetic device including the magnetic artificial superlattice according to any one of the first to fifth aspect, the magnetic device having magnetic function.

Advantageous Effect of the Invention

The present invention provides a magnetic artificial superlattice which exhibits high magneto-optical properties over a range from the ultraviolet region to the visible region, and allows precise control of the properties. Such a magnetic artificial superlattice can be produced at a low cost.

The magnetic artificial superlattice of the present invention is remarkably useful for the use in IT fields such as an optical isolator or high density magnetic recording, and other technical fields such as spin electronics.

DETAILED DESCRIPTION OF THE INVENTION

Figure 1:
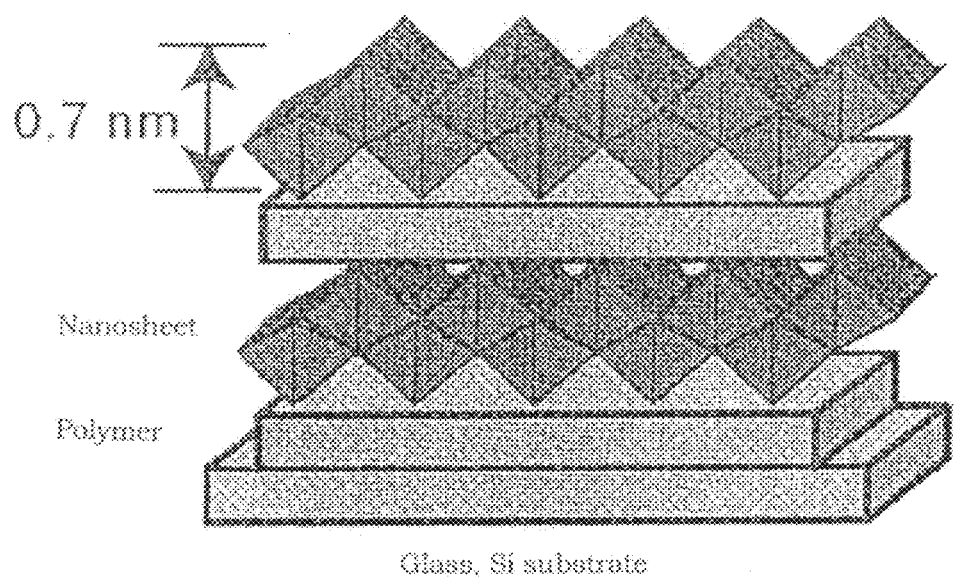
FIG. 1 shows a schematic view of the structure of magnetic titania nanosheets and multilayer film including the same.

The magnetic artificial superlattice of the present invention and the method for making the same are further described with reference to specific examples.

The magnetic artificial superlattice is composed of magnetic titania nanosheets (for example, $Ti_{0.8}Co_{0.202}$, $Ti_{0.6}Fe_{0.4}O_2$, or $Ti_{0.8}Ni_{0.202}$) and non-magnetic titania nanosheets (for example, $Ti_{0.91}O_2$). These nanosheets are two-dimensional semiconductor nanomaterials obtained by exfoliating a layer titanium compound to individual layers, which are the basic minimum units of the structure, by soft chemical treatment. The magnetic titania nanosheets are, for example, composed mainly of titania expressed by a composition formula $Ti_{1-x}M_xO_2$ (wherein M is at least one selected from V, Cr, Mn, Fe, Co, Ni, and Cu, and $0<x<1$, or M is at least two or more metals comprising one selected from V, Cr, Mn, Fe, Co, Ni, and Cu, and at least one selected from Li, Mg, and Al, and $0<x<1$). The non-magnetic nanosheets are, for example, composed mainly of titania expressed by a composition formula $Ti_{1-\delta}O_2$ ($0<\delta<0.5$) or $Ti_{1-x}M_xO_2$ (wherein M is one or more metals selected from Li, Mg, Al, V, Cr, Mn, Fe, Co, Ni, Cu, and Zn, $0 \leq x<1$).

The soft chemical treatment is combination of acid treatment and colloid formation. More specifically, a titanium oxide powder having a layer structure is exposed to an acid aqueous solution such as a hydrochloric acid solution, and the product is filtrated, washed, and dried thereby substituting the alkali metal ions between the layers with hydrogen ions. As a result of this, protonic form is obtained. Subsequently, the protonic form is added to an aqueous solution such as an amine solution, and stirred to form a colloid. During that time, the layers composing the layer structure are exfoliated to individual layers. The layer thickness is controllable in the range from subnanometers to nanometers.

Then, 20% to 40% titanium atoms in the lattices of non-magnetic titania nanosheets were substituted with magnetic elements such as cobalt, iron, and nickel to make magnetic titania nanosheets ($Ti_{0.8}CO_{0.2}O_2$, $Ti_{0.6}Fe_{0.4}O_2$, and $Ti_{0.6}Ni_{0.4}O_2$), and the magnetic titania nanosheets were laminated on a quartz glass or Si substrate with an organic polycation, which is a cationic polymer, sandwiched therebetween, using an alternate self-organizing lamination technique, which is based on the invention by the inventors described in Japanese Unexamined Patent Application Publication No. 2001-270022. More specifically, the substrate is (1) immersed in a titania sol solution, (2) washed with pure water, (3) immersed in an organic polycation solution, (4) and washed with pure water. The series of operations is repeated as necessary. Preferable examples of the organic polycation include polydiallyldimethylammonium chloride (PDDA), polyethyleneimine (PEI), and allylamine hydrochloride (PAH). The alternate lamination is not specifically limited as long as positive charges are introduced to the substrate surface. The organic polymer may be replaced with a positively charged inorganic polymer, or an inorganic compound containing a metal complex or a polynuclear hydrate ion.

Figure 2:
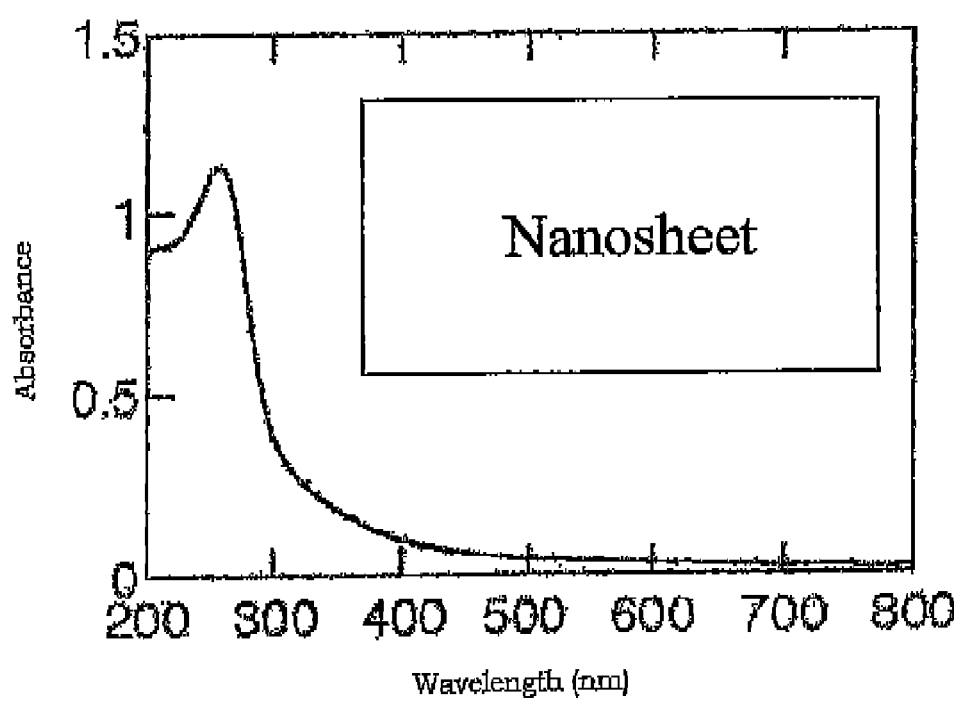
FIG. 2 shows an ultraviolet/visible absorption spectrum of a multilayer film $(Ti_{0.8}Co_{0.2}O_2)_{10}$ composed of total 10 layers of Co-substituted titania nanosheets and polydiallyldimethylammonium chloride (PDDA) laminated alternately on a quartz glass substrate, accompanied with a photograph of the multilayer film.

The magnetic titania nanosheets had a wide band gap (320 nm) due to a quantum size effect. As shown in FIG. 2, the sample prepared on a quartz glass substrate was transparent over a wide range of the visible region.

Figure 3:
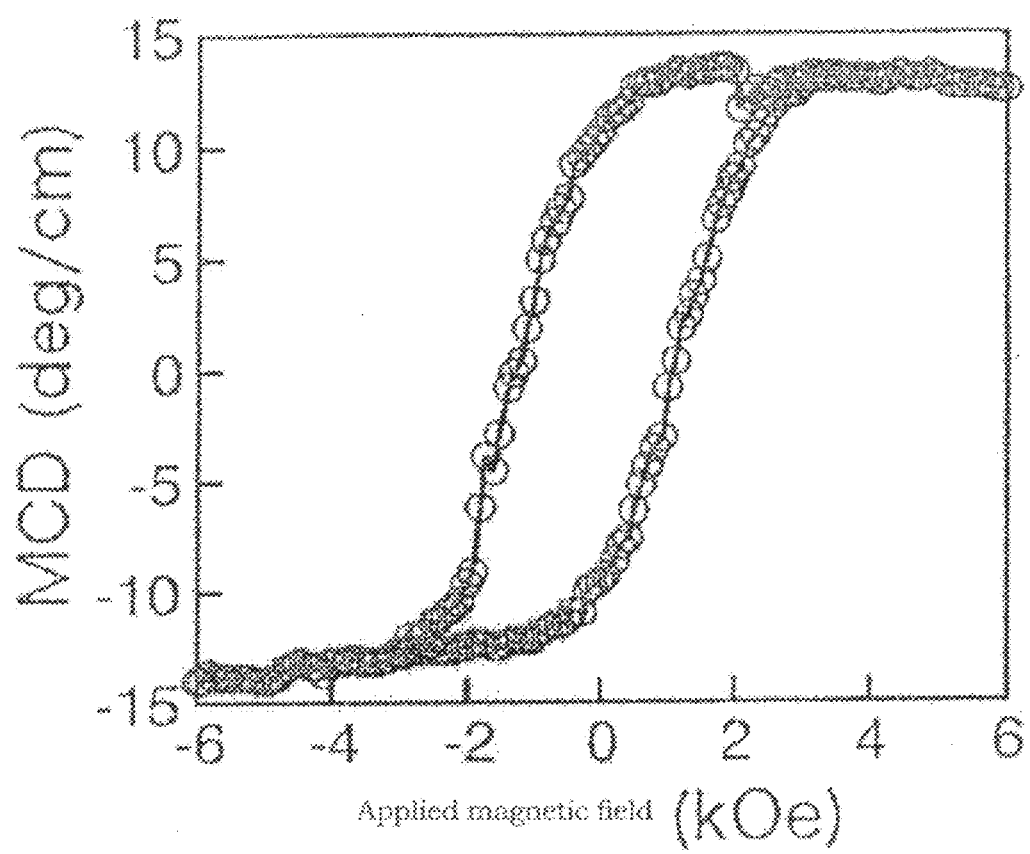
FIG. 3 shows the magneto-optical hysteresis characteristics at 320 nm of the multilayer film $(Ti_{0.8}Co_{0.2}O_2)_{10}$ composed of total 10 layers of Co-substituted titania nanosheets and polydiallyldimethylammonium chloride (PDDA) laminated alternately on a quartz glass substrate.

FIG. 3 shows the result of magneto-optical measurement of magnetic circular dichroism (MCD) of a multilayer film composed of 10-layered Co-substituted titania nanosheets at room temperature. The magneto-optical hysteresis properties shown in FIG. 3 indicate the reflectance difference between right-handed and left-handed circular polarization due to magnetization or spin polarization caused during light reflection by the magnetic substance. The properties correspond to the spin polarization and the spin-orbit interaction, and demonstrate the presence of magnetization.

In the magneto-optical measurement at 320 nm near the basic absorption edge, the multilayer film composed of 10-layered Co-substituted titania nanosheets exhibited a magneto-optical response characteristic of ferromagnetism, and was confirmed to serve as a ferromagnetic nanomaterial at room temperature. The figure-of-merit of magneto-optical performance was as high as about 13,000 deg/cm. Similar ferromagnetic magneto-optical response was exhibited by a multilayer film composed of 10-layered Fe-substituted titania nanosheets or Ni-substituted titania nanosheets. Accordingly, the titania nanosheets substituted with magnetic elements are considered to serve as a ferromagnetic substance at room temperature.

Figure 4:
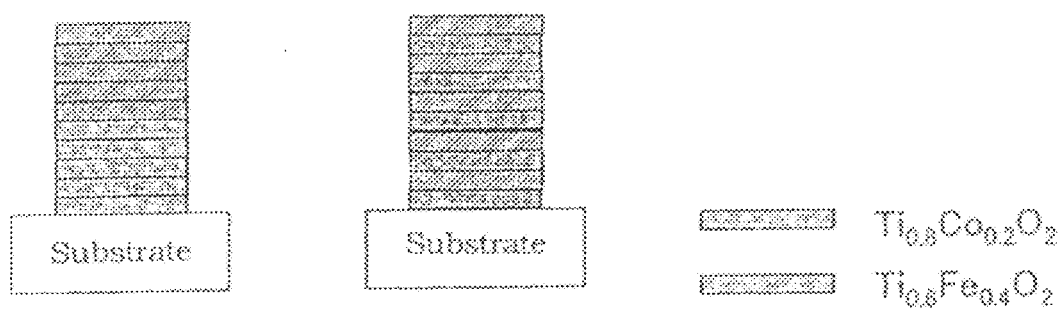
FIG. 4 shows a schematic view of the structures of artificial superlattices with different regularities composed of Co-substituted titania nanosheets or Fe-substituted titania nanosheets, $(Ti_{0.8}Co_{0.2}O_2)_5(Ti_{0.6}Fe_{0.4}O_2)_5$ and $(Ti_{0.8}CO_{0.2}O_2/Ti_{0.6}Fe_{0.4}O_2)_5$.

The above-described magnetic titania nanosheets were used to make a magnetic artificial superlattice. The number of laminated sheets, and the kind of the adjacent nanosheets were changed thereby controlling the interlayer optical transition through the interlayer magnetic interaction. FIG. 4 shows a schematic view of the structures of the magnetic artificial superlattices. As shown in FIG. 4, the superlattices with different regularities are $(Ti_{0.8}Co_{0.2}O_2)_5(Ti_{0.6}Fe_{0.4}O_2)_5$ and $(Ti_{0.8}Co_{0.2}O_2/Ti_{0.6}Fe_{0.4}O_2)_5$ specifically composed of Co-substituted titania nanosheets and Fe-substituted titania nanosheets, wherein five layers of the respective nanosheets are laminated alternately. For comparison, multilayer films composed of 10 layers of Co-substituted titania nanosheets or Fe-substituted nanosheets, $(Ti_{0.8}Co_{0.2}O_2)_{10}$ and $(Ti_{0.6}Fe_{0.4}O_2)_{10}$, were prepared.

Figure 5:
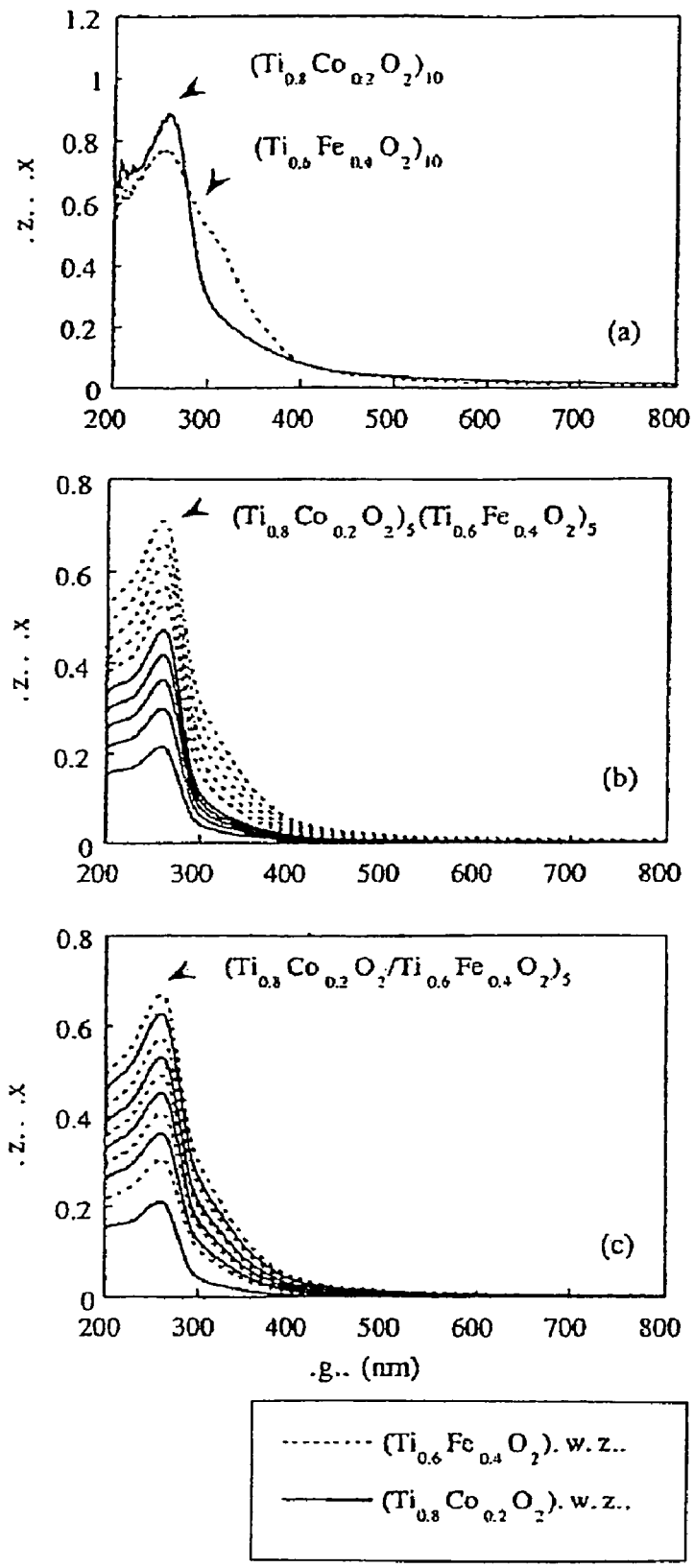
FIGS. 5(a) to 5(c) show the ultraviolet/visible absorption spectra of the base multilayer films $(Ti_{0.8}Co_{0.2}O_2)_{10}$ and $(Ti_{0.6}Fe_{0.4}O_2)_{10}$, and two artificial superlattices shown in FIG. 4, $(Ti_{0.8}CO_{0.2}O_2)_5(Ti_{0.6}Fe_{0.4}O_2)_5$ and $(Ti_{0.8}Co_{0.2}O_2/Ti_{0.6}Fe_{0.4}O_2)_5$, respectively.

FIG. 5(a) shows the ultraviolet/visible absorption spectra of multilayer films composed of Co-substituted titania nanosheets and Fe-substituted titania nanosheets, and FIGS. 5(b) and 5(c) show those of magnetic artificial superlattices including the two nanosheets. In the ultraviolet/visible absorption spectra shown in FIGS. 5(b) and 5(c), adsorption and accumulation corresponding to the component layers $Ti_{0.8}CO_{0.2}O_2$ or $Ti_{0.6}Fe_{0.4}O_2$ are found for every one adsorption cycle, which indicates the formation of the intended multilayer films, more specifically magnetic artificial superlattices. The two magnetic artificial superlattices showed the same absorption spectra because they have the same components, which indicates that they are optically equivalent.

The titania nanosheets may be laminated on a substrate by adsorption and accumulation, or spin coating or dip coating.

Figure 6:
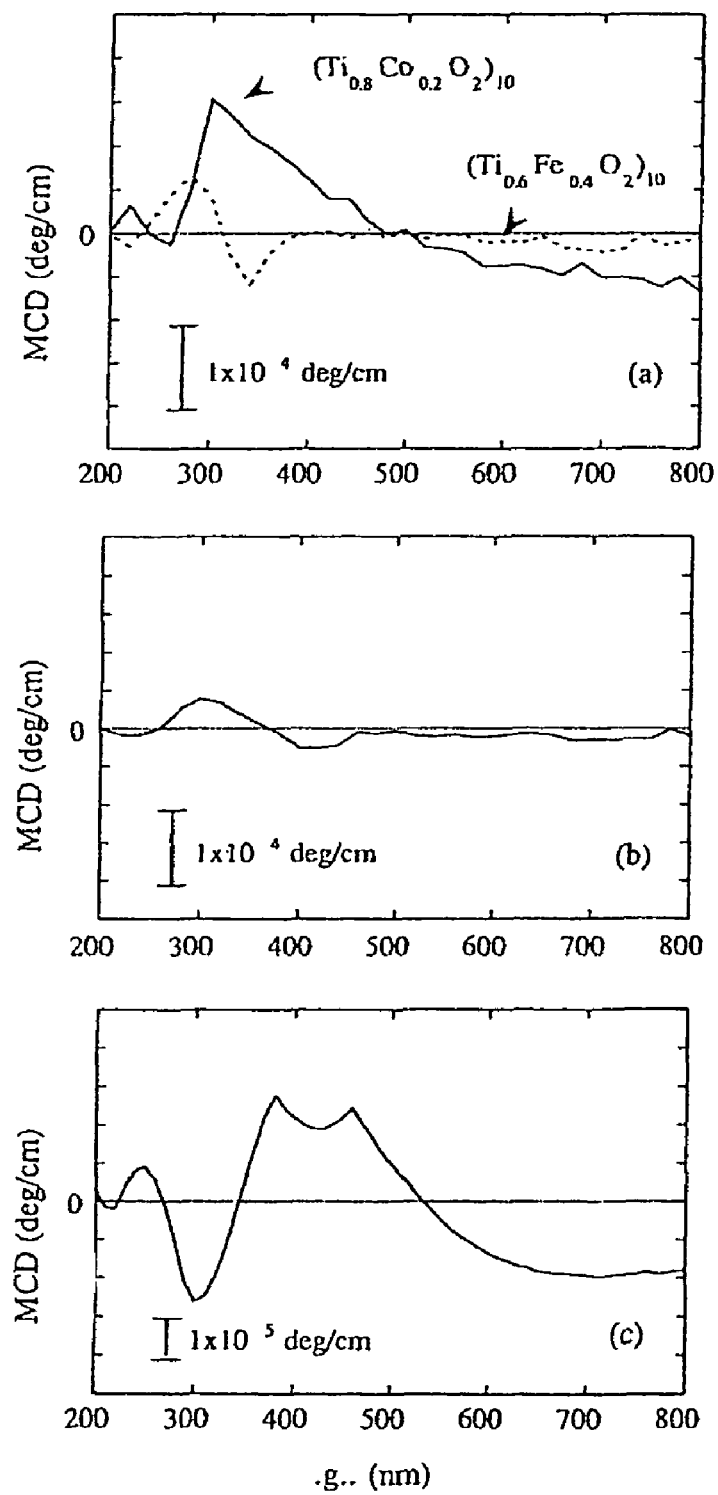
FIGS. 6(a) to 6(c) show the magneto-optical spectra of the base multilayer films $(Ti_{0.8}Co_{0.2}O_2)_{10}$ and $(Ti_{0.6}Fe_{0.4}O_2)_{10}$, and two artificial superlattices shown in FIG. 4; $(Ti_{0.8}CO_{0.2}O_2)_5(Ti_{0.6}Fe_{0.4}O_2)_5$ and $(Ti_{0.8}CO_{0.2}O_2/Ti_{0.6}Fe_{0.4}O_2)_5$, respectively.

FIG. 6(a) shows the magneto-optical spectra of multilayer films composed of Co-substituted titania nanosheets and Fe-substituted titania nanosheets, and FIGS. 6(b) and 6(c) show those of magnetic artificial superlattices $(Ti_{0.8}CO_{0.2}O_2)_5(Ti_{0.6}Fe_{0.4}O_2)_5$ and $(Ti_{0.8}Co_{0.2}O_2/Ti_{0.6}Fe_{0.4}O_2)_5$ shown in FIG. 4, in which two kinds of titania nanosheets are combined with different regularities. At room temperature, magnetic fields of ±10 kOe were applied at the respective wavelengths to detect MCD, and the results were plotted.

As shown in FIG. 6(a), the base multilayer films composed of Co-substituted titania nanosheets and Fe-substituted titania nanosheets showed magneto-optical responses of about 10000 times the characteristic values. As shown in FIG. 6(b), the magnetic artificial superlattice $(Ti_{0.8}Co_{0.2}O_2)_5(Ti_{0.6}Fe_{0.4}O_2)_5$ composed of 5 layers of Co-substituted titania nanosheets and 5 layers of Fe-substituted titania nanosheets showed a spectrum in which the spectra of the multilayer films each composed of Co-substituted titania nanosheets and Fe-substituted titania nanosheets shown in FIG. 6(a) were cancelled out, and its magneto-optical response was less than half that of the base film. The magnetic artificial superlattice $(Ti_{0.8}Co_{0.2}O_2/Ti_{0.6}Fe_{0.4}O_2)_5$ composed of 5 layers of Co-substituted titania nanosheets and 5 layers of Fe-substituted titania nanosheets laminated alternately is optically equivalent to $(Ti_{0.8}Co_{0.2}O_2)_5(Ti_{0.6}Fe_{0.4}O_2)_5$. However, as shown in FIG. 6(c), it exhibited about 20 times stronger magneto-optical responses than those corresponding to the d-d transition of $Co^{2+}$—$Fe^{3+}$ in the near-ultraviolet to visible region (wavelength: 330 nm to 500 nm). The strong magneto-optical responses are due to the interlayer interaction ($Co^{2+}$—$Fe^{3+}$ transition). The comparison between FIGS. 6(b) and 6(c) indicates that the peak wavelength and intensity are freely controllable.

Figure 7:
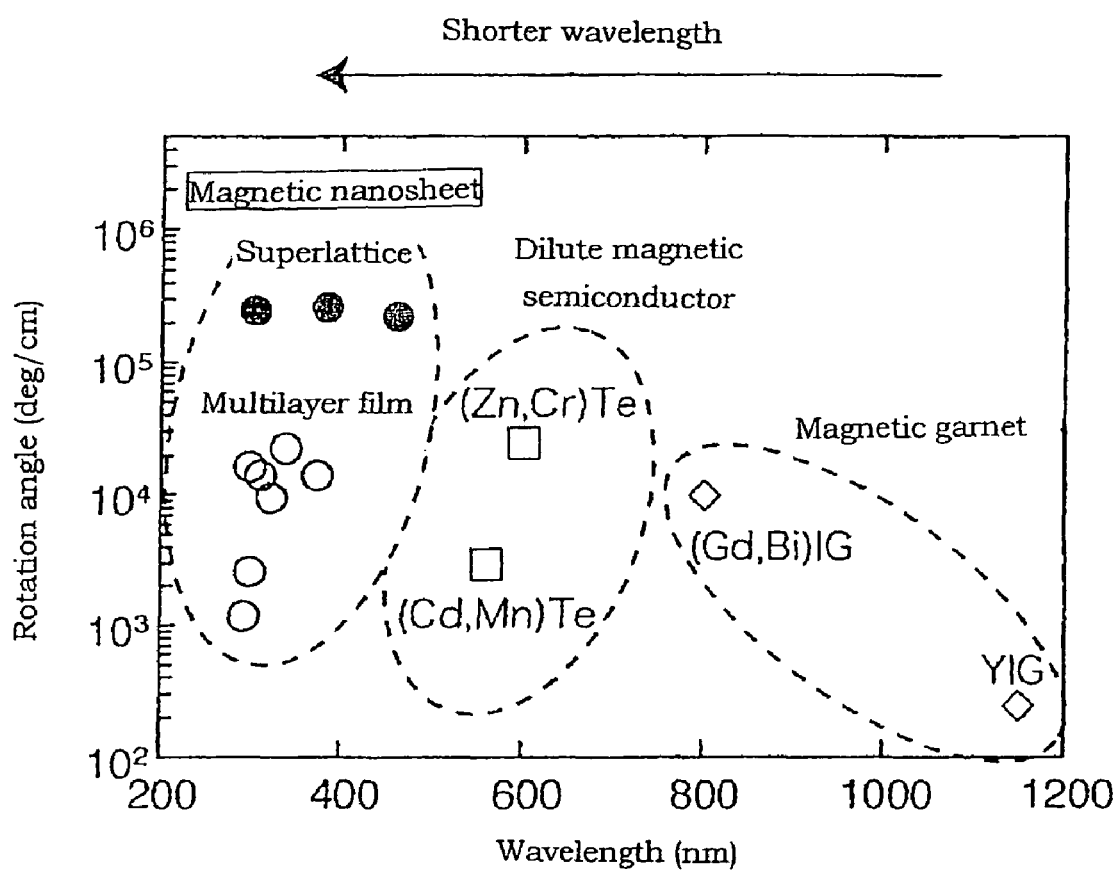
FIG. 7 shows the relationship between the maximum response wavelength and the performance index of the magneto-optical rotation angle per unit thickness of the magnetic artificial superlattice composed of titania nanosheets and typical isolator materials.

FIG. 7 shows the relationship between the maximum response wavelength and the figure-of-merit of the magneto-optical rotation angle per unit thickness of the above-described magnetic artificial superlattice composed of titania nanosheets and typical isolator materials. The magneto-optical effect of the magnetic artificial superlattice composed of titania nanosheets was exhibited at the shortest wavelength, which indicates that the magnetic artificial superlattice composed of titania nanosheets has an excellent magneto-optical performance index which is far greater than that of magnetic garnet in practical use.

Figure 8:
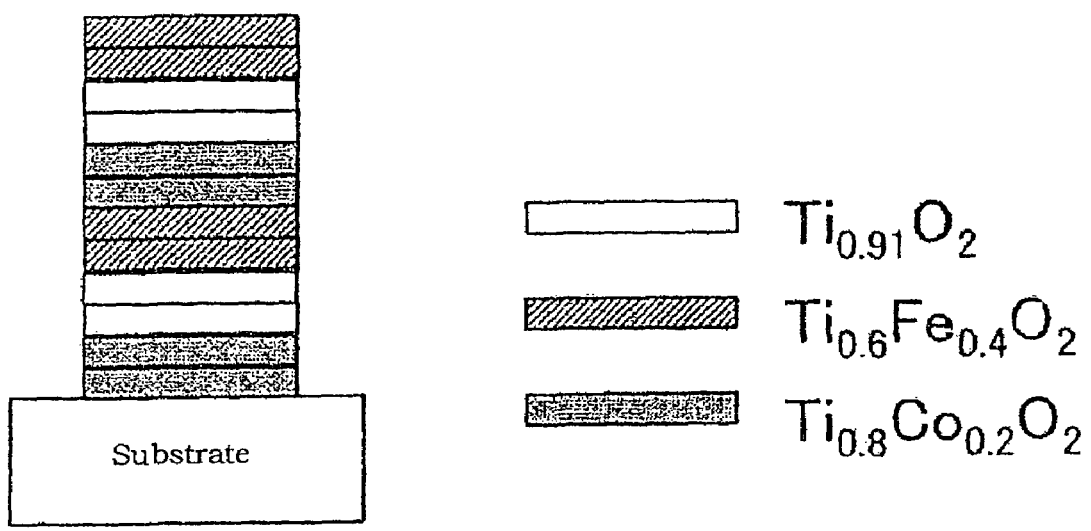
FIG. 8 shows the schematic diagram of the structure of the tri-color magnetic artificial superlattice $[(Ti_{0.8}Co_{0.2}O_2)_2(Ti_{0.91}O_2)_2(Ti_{0.6}Fe_{0.4}O_2)_2]_2$.

FIG. 8 shows the schematic diagram of the structure of the tri-color magnetic artificial superlattice $[(Ti_{0.8}Co_{0.2}O_2)_2(Ti_{0.91}O_2)_2(Ti_{0.6}Fe_{0.4}O_2)_2]_2$ made by inserting non-magnetic nanosheets $(Ti_{0.91}O_2)$ between the layers of magnetic artificial superlattices $(Ti_{0.8}Co_{0.2}O_2/Ti_{0.6}Fe_{0.4}O_2)_n$ in which Co-substituted titania nanosheets and Fe-substituted titania nanosheets are adjacent to each other.

Figure 9:
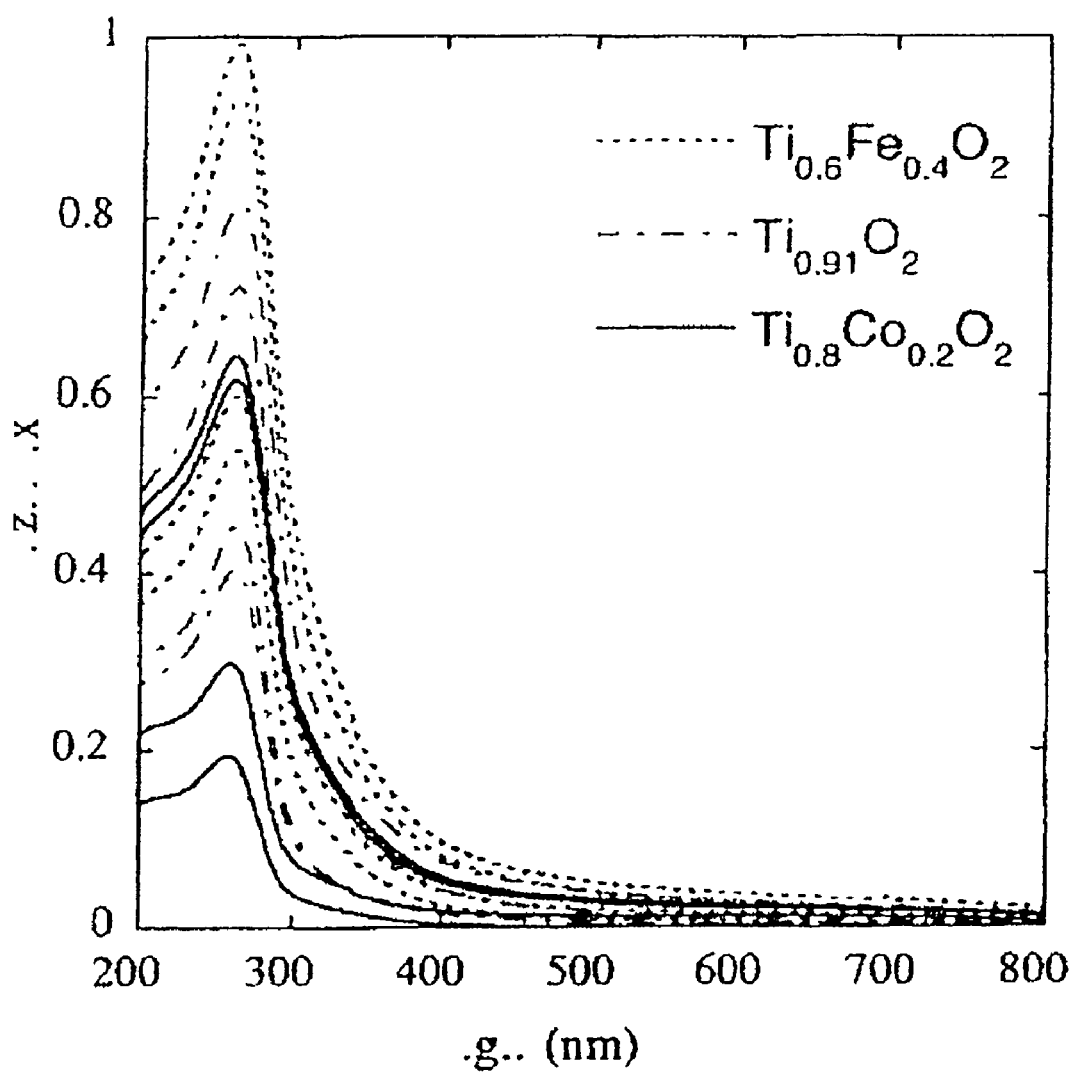
FIG. 9 shows the ultraviolet/visible absorption spectra of the magnetic artificial superlattice $[(Ti_{0.8}Co_{0.2}O_2)_2(Ti_{0.91}O_2)_2(Ti_{0.6}Fe_{0.4}O_2)_2]_2$.

FIG. 9 shows the ultraviolet/visible absorption spectra of the magnetic artificial superlattice $[(Ti_{0.8}CO_{0.2}O_2)_2(Ti_{0.91}O_2)_2(Ti_{0.6}Fe_{0.4}O_2)_2]_2$. In the ultraviolet/visible absorption spectra, adsorption and accumulation of the component layers, $Ti_{0.8}CO_{0.2}O_2$, $Ti_{0.6}Fe_{0.4}O_2$, and $Ti_{0.91}O_2$ nanosheets are found for every one adsorption cycle, which indicates the formation of the intended magnetic artificial superlattice.

Figure 10:
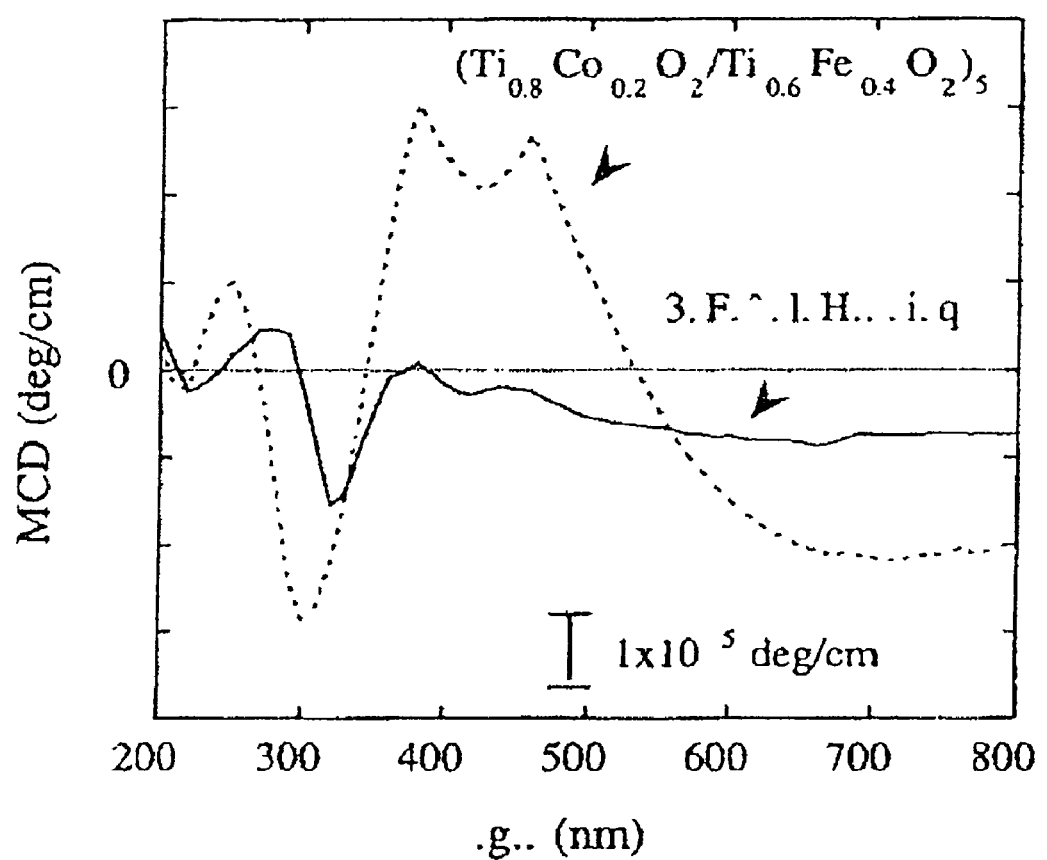
FIG. 10 shows the magneto-optical spectra of the magnetic artificial superlattices $[(Ti_{0.8}Co_{0.2}O_2)_2(Ti_{0.91}O_2)_2(Ti_{0.6}Fe_{0.4}O_2)_2]_2$ and $(Ti_{0.8}Co_{0.2}O_2/Ti_{0.6}Fe_{0.4}O_2)_5$ at room temperature.

FIG. 10 shows the magneto-optical spectra of the magnetic artificial superlattice $[(Ti_{0.8}Co_{0.2}O_2)_2(Ti_{0.91}O_2)_2(Ti_{0.6}Fe_{0.4}O_2)_2]_2$ at room temperature. FIG. 10 also shows the magneto-optical spectrum of the magnetic artificial superlattice $(Ti_{0.8}Co_{0.2}O_2/Ti_{0.6}Fe_{0.4}O_2)_5$ shown in FIG. 6(c). In the magnetic artificial superlattice $[(Ti_{0.8}CO_{0.2}O_2)_2(Ti_{0.91}O_2)_2(Ti_{0.6}Fe_{0.4}O_2)_2]_2$, non-magnetic spacer layers are inserted between the layers of the magnetic artificial superlattice $(Ti_{0.8}Co_{0.2}O_2/Ti_{0.6}Fe_{0.4}O_2)$, so that the magneto-optical response owing to the interlayer interaction ($Co^{2+}$—$Fe^{3+}$ transition) exhibited by the magnetic artificial superlattice $(Ti_{0.8}Co_{0.2}O_2/Ti_{0.6}Fe_{0.4}O_2)_5$ decreased. The phenomenon demonstrates that the peak wavelength and intensity of the magneto-optical response are freely controllable through the utilization of the interlayer interaction.

Figure 11:
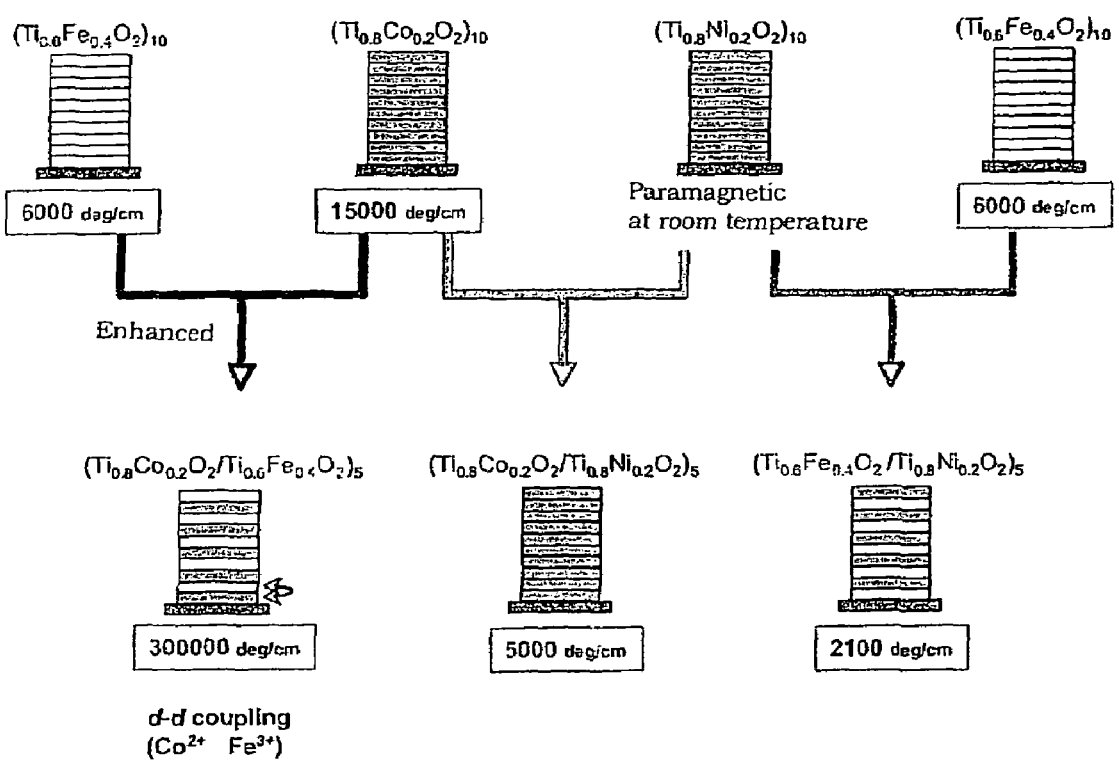
FIG. 11 shows the schematic structures of magnetic artificial superlattices having different properties, accompanied with their magneto-optical intensities, wherein the magnetic artificial superlattices are composed of two kinds of nanosheets selected from Fe-substituted titania nanosheets, Co-substituted titania nanosheets, and Ni-substituted titania nanosheets, and five layers of the respective nanosheets are laminated alternately.

Other magnetic artificial superlattices composed of Ni-substituted titania nanosheets and Fe-substituted titania nanosheets or Co-substituted titania nanosheets laminated alternately are also freely controllable with regard to their properties in the same manner as described above, for example, the increase of the magneto-optical intensity and the shift of the response peak. The examples are shown in FIG. 11.

Figure 12:
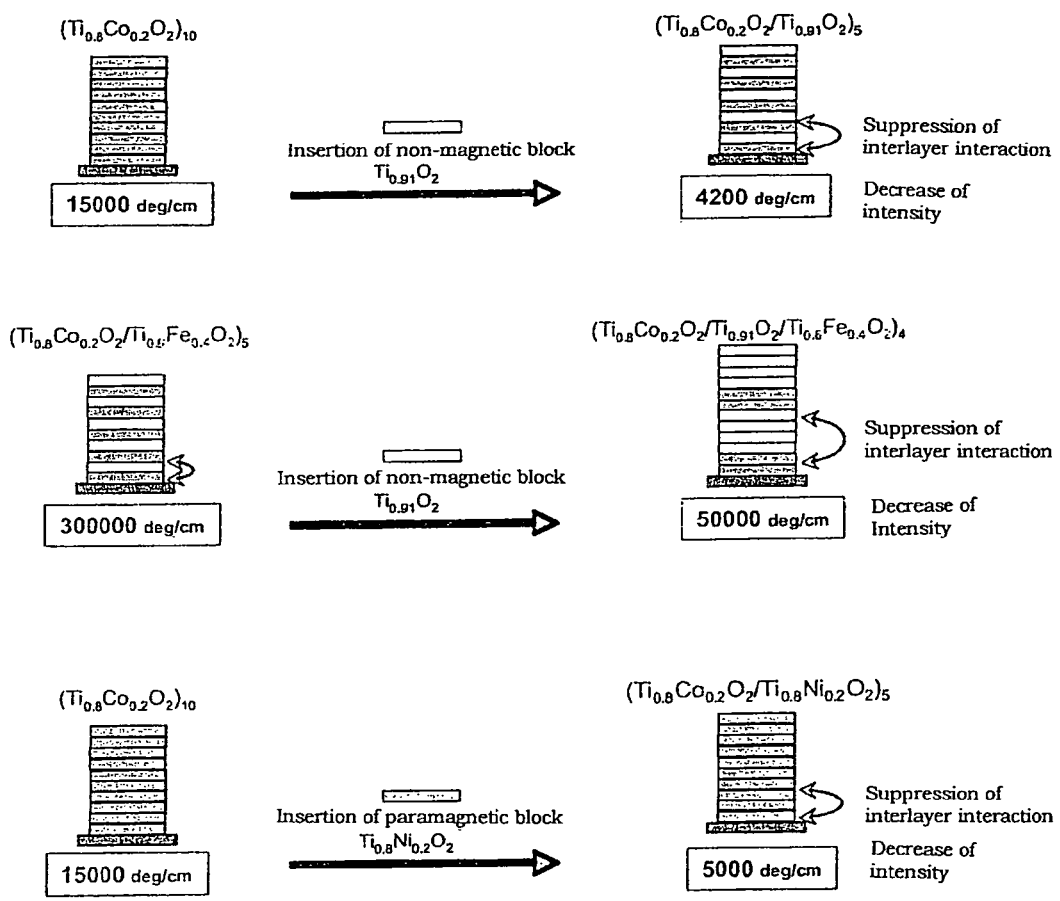
FIG. 12 schematically shows the control of magneto-optical intensity of magnetic artificial superlattices through insertion of paramagnetic nanosheets and non-magnetic nanosheets between layers of the superlattices.

As described above, the interlayer insertion of the nonmagnetic nanosheet ($Ti_{0.91}O_2$) suppressed the interlayer interaction of the ferromagnetic titania nanosheets, which resulted in the decrease of the magneto-optical intensity. Similar phenomenon is caused by interlayer insertion of paramagnetic nanosheets which do not exhibit ferromagnetic properties at room temperature, such as $Ti_{0.8}Ni_{0.2}O_2$ and $Co_{2/3}Al_{1/3}(OH)_2$. The examples are shown in FIG. 12.

The magnetic artificial superlattice composed of Co-substituted titania nanosheets and Fe-substituted titania nanosheets, which had achieved remarkable enhancement of the magneto-optical effect, showed peaks near 1.9-2.0 eV and 2.5-3.6 eV, in relation to the d-d electron transitions $Co^{2+}$ d-d (1.9-2.1 eV), $Fe^{3+}$ d-d (1.7, 2.4-3.0 eV), and $Co^{2+}$—$Fe^{3+}$ (to 2.5 eV). These peaks are due to the strong interlayer interaction between $Co^{2+}$ ($d^7$) and $Fe^{3+}$ ($d^5$). The interlayer interaction varies the magnetic interaction between the layers of the magnetic titania nanosheets, and allows the free control of the magneto-optical properties. The reason why the magnetic artificial superlattice composed of Co-substituted titania nanosheets exhibited excellent properties is likely due to that the $Co^{2+}$ d-d charge transfer transition ($Co^{2+}$—$Co^{3+}$) or $Co^{2+}$—$Fe^{3+}$ ($Co^{2+}$—$Fe^{3+}$—$Co^{3+}$—$Fe^{2+}$) causes the transition from the initial $Co^{2+}$ (d7) in the low spin state (s=½) to $Co^{3+}$ (d6) in the high spin state (s=2) having excellent magnetic properties.

Figure 13:
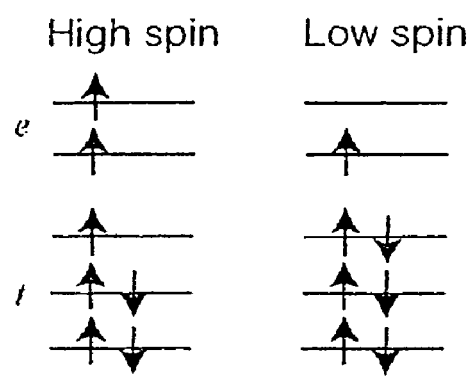
FIG. 13 shows the spin configurations of $Co^{2+}$, $Ni^{3+}$ ($d^7$), $Fe^{3+}$, and $Mn^{2+}$ ($d^5$)
Figure 13:
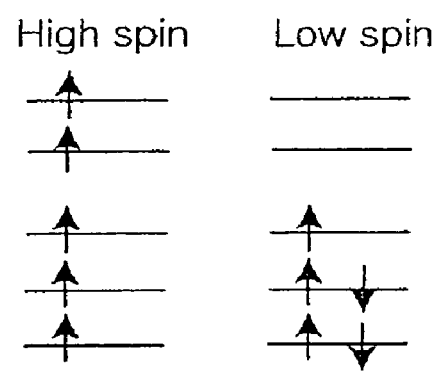

In general, the magnetic properties of 3d transition metal elements are, as shown in FIG. 13, in relation to the spin configuration defined by the 3d electron number ($d^n$: n=electron number). Therefore, combinations composed of $Ni^{3+}$ ($d^7$) and $Mn^{2+}$ ($d^5$), which have the same spin configurations with $Co^{2+}$ ($d^7$) and $Fe^{3+}$ ($d^5$), more specifically $Ni^{3+}$—$Fe^{3+}$, $Ni^{3+}$—$Mn^{2+}$, and $Co^{2+}$—$Mn^{2+}$ are considered to allow free control of the magneto-optical properties.

Figure 14:
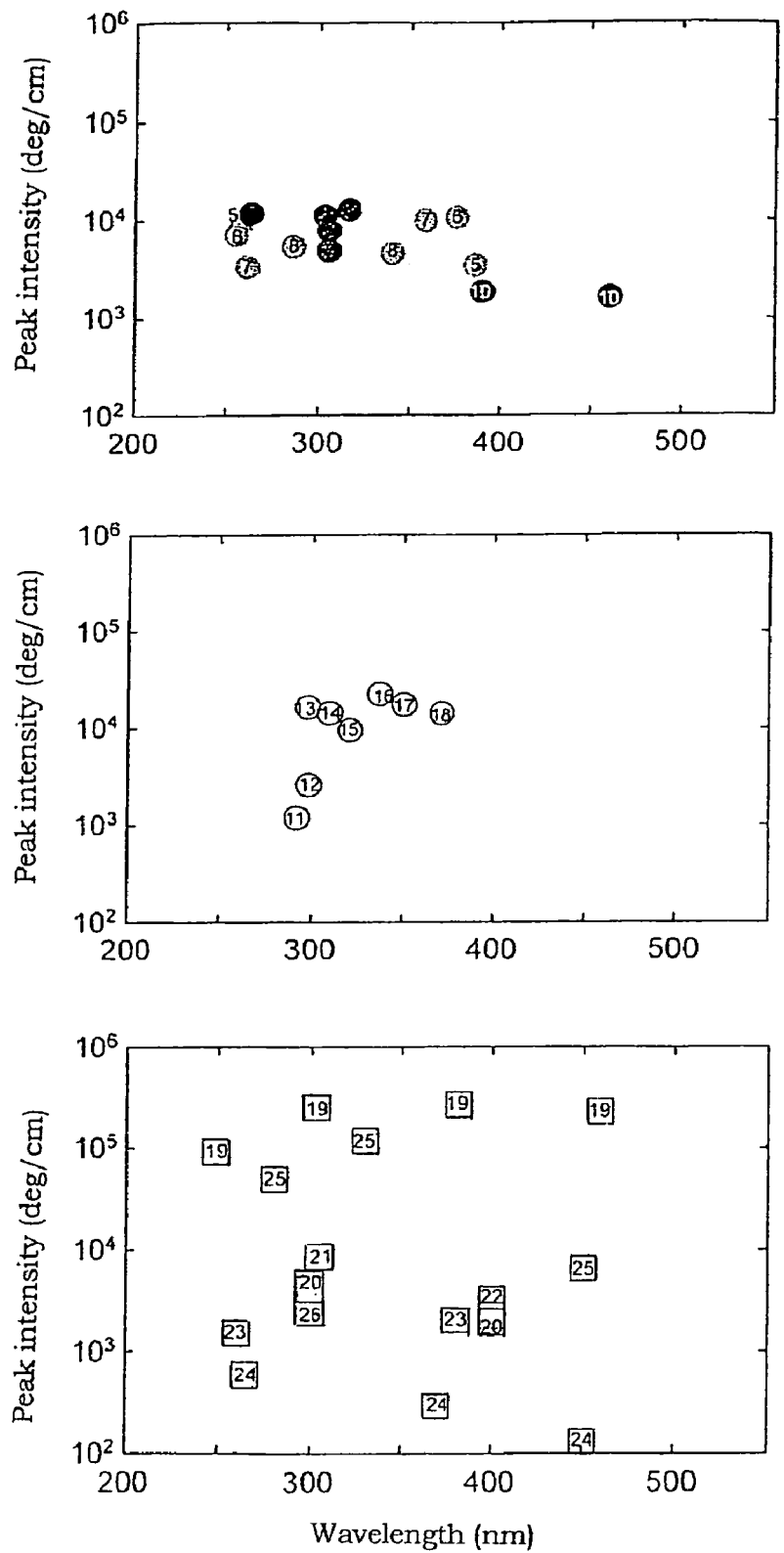
FIG. 14 shows the magneto-optical properties of a magnetic artificial superlattice, and those of the multilayer films of magnetic titania nanosheets and paramagnetic nanosheets composing the magnetic artificial superlattice.

Table 1 and FIG. 14 show the magneto-optical properties of the above-described magnetic artificial superlattices and the multilayer films of magnetic titania nanosheets and paramagnetic nanosheets composing the superlattices.

TABLE 1

| No. | Block structure | Magneto-optical properties | |
|---|---|---|---|
| | | Peak wavelength (nm) | Peak intensity (deg/cm) |
| 1 | $(Ti_{0.8}Co_{0.2}O_2)_{10}$ | 305 | 14591 |
| 2 | $(Ti_{0.85}Co_{0.15}O_2)_{10}$ | 305 | 11280 |
| 3 | $(Ti_{0.9}Co_{0.1}O_2)_{10}$ | 303 | 8034 |
| 4 | $(Ti_{0.95}Co_{0.05}O_2)_{10}$ | 309 | 4950 |
| 5 | $(Ti_{0.6}Fe_{0.4}O_2)_{10}$ | 261/386 | 5470/4660 |
| 6 | $(Ti_{0.7}Fe_{0.3}O_2)_{10}$ | 255/375 | 9910/10010 |
| 7 | $(Ti_{0.8}Fe_{0.2}O_2)_{10}$ | 258/358 | 7170/10800 |
| 8 | $(Ti_{0.9}Fe_{0.1}O_2)_{10}$ | 286/340 | 3410/3504 |
| 9 | $(Ti_{0.8}Ni_{0.2}O_2)_{10}$ | 263 | 12000 |
| 10 | $[Co_{2/3}Al_{1/3}(OH)_2]_{20}$ | 390/460 | 1900/1680 |
| 11 | $(Ti_{0.8}Co_{0.2}O_2)_3$ | 292 | 1219 |
| 12 | $(Ti_{0.8}Co_{0.2}O_2)_5$ | 298 | 2660 |
| 13 | $(Ti_{0.8}Co_{0.2}O_2)_7$ | 297 | 16821 |
| 14 | $(Ti_{0.8}Co_{0.2}O_2)_{10}$ | 309 | 14591 |
| 15 | $(Ti_{0.8}Co_{0.2}O_2)_{15}$ | 320 | 9779.5 |
| 16 | $(Ti_{0.8}Co_{0.2}O_2)_{20}$ | 337 | 23044 |
| 17 | $(Ti_{0.8}Co_{0.2}O_2)_{30}$ | 350 | 17895 |
| 18 | $(Ti_{0.8}Co_{0.2}O_2)_{50}$ | 371 | 14509 |
| 19 | $(Ti_{0.8}Co_{0.2}O_2/Ti_{0.6}Fe_{0.4}O_2)_5$ | 248/303/381/459 | 93495/256097/272357/231710 |
| 20 | $(Ti_{0.8}Co_{0.2}O_2)_5(Ti_{0.6}Fe_{0.4}O_2)_5$ | 300/401 | 3000/2020 |
| 21 | $(Ti_{0.8}Co_{0.2}O_2)_7(Ti_{0.6}Fe_{0.4}O_2)_3$ | 305 | 8720 |
| 21 | $(Ti_{0.8}Co_{0.2}O_2/Ti_{0.8}Ni_{0.2}O_2)_5$ | 450 | 6600 |
| 22 | $(Ti_{0.8}Fe_{0.2}O_2)_5(Ti_{0.8}Ni_{0.2}O_2)_5$ | 400 | 2300 |
| 23 | $(Ti_{0.6}Fe_{0.4}O_2/Ti_{0.8}Ni_{0.2}O_2)_5$ | 260/380 | 1560/2102 |
| 24 | $(Ti_{0.8}Co_{0.2}O_2/Co_{2/3}Al_{1/3}(OH)_2)_5$ | 265/370/450 | 600/300/130 |
| 25 | $(Ti_{0.8}Co_{0.2}O_2/Ti_{0.91}O_2/Ti_{0.6}Fe_{0.4}O_2)_4$ | 280/330 | 50000/120300 |
| 26 | $(Ti_{0.8}Co_{0.2}O_2/Ti_{0.91}O_2)_5$ | 300 | 4200 |

INDUSTRIAL APPLICABILITY

As described above, the present invention allows production of a magnetic artificial superlattice which exhibits high magneto-optical properties over a wide range from the ultraviolet region to the visible region, and free control of the properties of the superlattice through the utilization of characteristics of magnetic titania nanosheets, which are two-dimensional nanostructures composing the superlattice, such as high controllability over tissues and structures, and unique nanophysical properties. Known garnet materials are difficult to fuse with semiconductor devices or molecule electronics, while magnetic titania nanosheets can be fused at low cost with various materials through the use of soft chemical reaction such as self-organizing. For example, feasible is a magnetic artificial superlattice composed of thin films of a magnetic artificial superlattice and at least one selected from an organic polymer, an inorganic polymer, and an inorganic compound containing a metal complex or a polynuclear hydrate ion. Accordingly, the magnetic artificial superlattice of the present invention is remarkably useful in IT technical fields such as an optical isolator or high density magnetic recording, and other technical fields such as nanospin electronics and molecule electronics.

In particular, the magneto-optical effect is a unique characteristic useful for optical isolation. Optical isolators utilizing the magneto-optical effect are integrated in every system for optical communication. Of particular note is a material which exhibits great magneto-optical properties according to the wavelengths of optical information communication. Since the magnetic artificial superlattice of the present invention has high magneto-optical properties in the ultraviolet region, so is very useful for the above applications. For example, the magnetic artificial superlattice may be used to make a magneto-optical device which responds to short-wavelength visible light and ultraviolet light, or a magnetic device having magnetic function.

The invention claimed is:

1. A magnetic artificial superlattice comprising laminated thin films of two or more kinds of magnetic flaky particles, the laminated thin films of magnetic flaky particles being magnetic titania nanosheets, obtained by exfoliation of a layer titanium oxide in which Ti atoms in the lattice have been substituted with magnetic elements, wherein the magnetic titania nanosheets are laminated with at least one film sandwiched between the magnetic titania nanosheets, the at least one film being made of an inorganic polymer, an organic polymer, or an inorganic compound comprising a metal complex or a polynuclear hydrate ion, wherein the magnetic elements of respective kinds of the magnetic titania nanosheets are different from each other, and wherein magneto-optical properties of the magnetic artificial superlattice are controllable based on control of optical transition between the different magnetic elements via interlayer interaction of the titania nanosheets.

2. The magnetic artificial superlattice according to claim 1, further comprising:

laminated thin films of flaky particles obtained by exfoliation of a layer titanium oxide so as to be non-magnetic titania nanosheets.

3. The magnetic artificial superlattice according to claim 2, wherein the non-magnetic titania nanosheets are comprised mainly of titania expressed by a composition formula $Ti_{1-\delta}O_2$ ($0<\delta<0.5$) or $Ti_{1-x}M_xO_2$ (wherein M is one or more metals selected from Li, Mg, Al, and Zn, $0\leq x<1$).

4. A magneto-optical device comprising the magnetic artificial superlattice according to claim 3, the magneto-optical device responding to short-wavelength visible light and ultraviolet light.

5. The magnetic artificial superlattice according to claim 2, wherein the magnetic titania nanosheets are comprised mainly of titania expressed by a composition formula $Ti_{1-x}M_xO_2$ (wherein M is at least one selected from V, Cr, Mn, Fe, Co, Ni, and Cu, and $0<x<1$, or M is at least two or more metals comprising one metal selected from V, Cr, Mn, Fe, Co, Ni, and Cu, and at least one metal selected from Li, Mg, and Al, and $0<x<1$).

6. A magneto-optical device comprising the magnetic artificial superlattice according to claim 2, the magneto-optical device responding to short-wavelength visible light and ultraviolet light.

7. A magnetic device comprising the magnetic artificial superlattice according to claim 2, the magnetic device having magnetic function.

8. The magnetic artificial superlattice according to claim 1, wherein the magnetic titania nanosheets are comprised mainly of titania expressed by a composition formula $Ti_{1-x}M_xO_2$ (wherein M is at least one selected from V, Cr, Mn, Fe, Co, Ni, and Cu, and $0<x<1$, or wherein M is at least two or more metals comprising one metal selected from V, Cr, Mn, Fe, Co, Ni, and Cu, and at least one metal selected from Li, Mg, and Al, and $0<x<1$).

9. A magneto-optical device comprising the magnetic artificial superlattice according to claim 8, the magneto-optical device responding to short-wavelength visible light and ultraviolet light.

10. A magneto-optical device comprising the magnetic artificial superlattice according to claim 1, the magneto-optical device responding to short-wavelength visible light and ultraviolet light.

11. A magnetic device comprising the magnetic artificial superlattice according to claim 1, the magnetic device having magnetic function.

12. A method for making a magnetic artificial superlattice, comprising:

laminating two or more kinds of magnetic titania nanosheets obtained by exfoliating a layer titanium oxide in which Ti atoms in the lattice have been substituted with magnetic elements, or laminating the magnetic titania nanosheets and non-magnetic titania nanosheets, on a substrate with an organic polycation sandwiched therebetween, wherein the organic polycation is an inorganic polymer, an organic polymer, or an inorganic compound comprising a metal complex or a polynuclear hydrate ion, wherein the magnetic elements of respective kinds of the magnetic titania nanosheets are different from each other, and wherein magneto-optical properties of the magnetic artificial superlattice are controllable based on control of optical transition between the different magnetic elements via interlayer interaction of the titania nanosheets.

13. The method for making a magnetic artificial superlattice according to claim 12, wherein the titania nanosheets are laminated by adsorption and accumulation on the substrate.

14. The method for making a magnetic artificial superlattice according to claim 12, wherein the titania nanosheets are laminated by spin coating or dip coating.

* * * * *